(12) United States Patent
Blatz

(10) Patent No.: US 6,994,503 B2
(45) Date of Patent: Feb. 7, 2006

(54) QUICK-LOCK NUT FOR A DISC-LIKE TOOL

(75) Inventor: Thomas Blatz, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/786,207

(22) Filed: Feb. 25, 2004

(65) Prior Publication Data
US 2004/0228701 A1 Nov. 18, 2004

(30) Foreign Application Priority Data
Feb. 28, 2003 (DE) ................. 103 08 743

(51) Int. Cl.
F16B 37/08 (2006.01)
B27B 5/30 (2006.01)
B27B 5/32 (2006.01)

(52) U.S. Cl. ..................................... 411/432
(58) Field of Classification Search ........ 411/431–432, 411/193–194, 202, 231, 348, 535, 272, 312, 411/935, 350, 297–298, 402, 408, 410, 926, 411/979, 435, 542; D08/62; 267/164, 182, 267/137
See application file for complete search history.

(56) References Cited

U.S. PATENT DOCUMENTS

| 518,165 | A | * | 4/1894 | Thalaker | 411/228 |
|---|---|---|---|---|---|
| 675,664 | A | * | 6/1901 | Moore | 411/253 |
| 1,040,609 | A | * | 10/1912 | Bevan et al. | 411/297 |
| 1,242,786 | A | * | 10/1917 | Finch | 411/297 |
| 1,328,488 | A | * | 1/1920 | Bowden | 138/89.4 |
| 1,394,778 | A | * | 10/1921 | Menchen et al. | 411/292 |
| 1,466,176 | A | * | 8/1923 | Kraft | 411/432 |
| 1,561,880 | A | * | 11/1925 | Morrison et al. | 411/265 |
| 1,636,669 | A | * | 7/1927 | Blauvelt | 175/366 |
| 1,750,523 | A | * | 3/1930 | Kaschitofsky | 411/197 |
| 2,396,142 | A | * | 3/1946 | Allen | 411/432 |
| 3,009,722 | A | * | 11/1961 | Gustav | 411/542 |
| 3,302,960 | A | * | 2/1967 | Herrmann | 403/325 |
| 3,319,689 | A | * | 5/1967 | McDougall et al. | 411/260 |
| 3,581,609 | A | * | 6/1971 | Greenwood | 81/124.7 |
| 3,830,271 | A | * | 8/1974 | Soubitez | 411/190 |
| 4,322,190 | A | * | 3/1982 | Anderson | 409/234 |
| 4,453,449 | A | * | 6/1984 | Hollmann | 89/1.806 |
| 4,681,350 | A | * | 7/1987 | Gaita | 285/315 |
| 4,687,392 | A | * | 8/1987 | Bidwell | 411/6 |
| 4,716,668 | A | * | 1/1988 | Hahn | 37/458 |
| 4,768,909 | A | * | 9/1988 | Warkotsch | 411/433 |
| 4,850,154 | A | * | 7/1989 | Grammer et al. | 451/548 |

(Continued)

FOREIGN PATENT DOCUMENTS

DE 3012836 A * 10/1981

(Continued)

Primary Examiner—Robert J. Sandy
Assistant Examiner—Jeffrey A. Sharp
(74) Attorney, Agent, or Firm—Abelman, Frayne & Schwab

(57) ABSTRACT

A quick lock nut (1) for positive friction locking securement of a disc-like tool (2) to an external thread (3) on a working spindle (4) driven about an axis of rotation (A), having an associated inner threaded part (5) and a manually displaceable tensioning means (6, 6', 6") for axial clamping and release of the inner threaded part (5) relative to the tool (2), wherein at least one flat spring (7) extending essentially parallel to the axis of rotation (A) is associated with the inner threaded part (5) on the tool side, by means of which the inner threaded part (5) can be axially resiliently tensioned with the tool (2).

13 Claims, 3 Drawing Sheets

U.S. PATENT DOCUMENTS

| | | | | |
|---|---|---|---|---|
| 4,941,790 A | * | 7/1990 | Kirn | 411/432 |
| 4,955,744 A | * | 9/1990 | Barth et al. | 403/259 |
| 5,042,207 A | * | 8/1991 | Kirn | 451/342 |
| 5,161,334 A | * | 11/1992 | Schaal et al. | 451/342 |
| 5,180,268 A | * | 1/1993 | Richardson | 411/536 |
| 5,288,191 A | * | 2/1994 | Ruckert et al. | 411/432 |
| 5,364,213 A | * | 11/1994 | Teramura | 411/431 |
| 5,388,942 A | * | 2/1995 | Bonacina et al. | 411/432 |
| 5,545,078 A | * | 8/1996 | Schulz et al. | 451/342 |
| 5,567,100 A | * | 10/1996 | Nakamura | 411/433 |
| 5,577,872 A | * | 11/1996 | Nakamura | 411/432 |
| 5,603,595 A | * | 2/1997 | Nygren, Jr. | 411/14.5 |
| 5,810,533 A | * | 9/1998 | Nakamura | 411/432 |
| 5,871,322 A | * | 2/1999 | Nakamura | 411/432 |
| 5,899,648 A | * | 5/1999 | Kanaan et al. | 411/432 |
| 6,027,294 A | * | 2/2000 | Newby | 411/231 |
| 6,149,364 A | * | 11/2000 | Maeda | 411/432 |
| 6,158,936 A | * | 12/2000 | Thommes | 411/304 |
| 6,179,512 B1 | * | 1/2001 | Gibson et al. | 403/374.1 |
| 6,244,806 B1 | * | 6/2001 | Kato | 411/265 |
| 6,261,041 B1 | * | 7/2001 | Nakamura | 411/432 |
| 6,273,659 B1 | * | 8/2001 | Goto | 411/432 |
| 6,701,629 B2 | * | 3/2004 | Krondorfer et al. | 30/390 |
| 6,786,811 B2 | * | 9/2004 | Krondorfer et al. | 451/342 |
| 6,808,347 B2 | * | 10/2004 | Liersch | 411/6 |
| 2003/0152443 A1 | * | 8/2003 | Liersch | 411/432 |

FOREIGN PATENT DOCUMENTS

| | | | | |
|---|---|---|---|---|
| DE | 3210448 | | | 9/1983 |
| DE | 3605821 | | | 8/1987 |
| DE | 3644440 | A | * | 7/1988 |
| DE | 3644441 | A | * | 7/1988 |
| DE | 3903765 | A | * | 8/1990 |
| DE | 3903767 | A1 | * | 8/1990 |
| DE | 3917345 | A1 | * | 11/1990 |
| DE | 0002263 | | | 7/2001 |
| WO | WO 8804975 | A1 | * | 7/1988 |

* cited by examiner

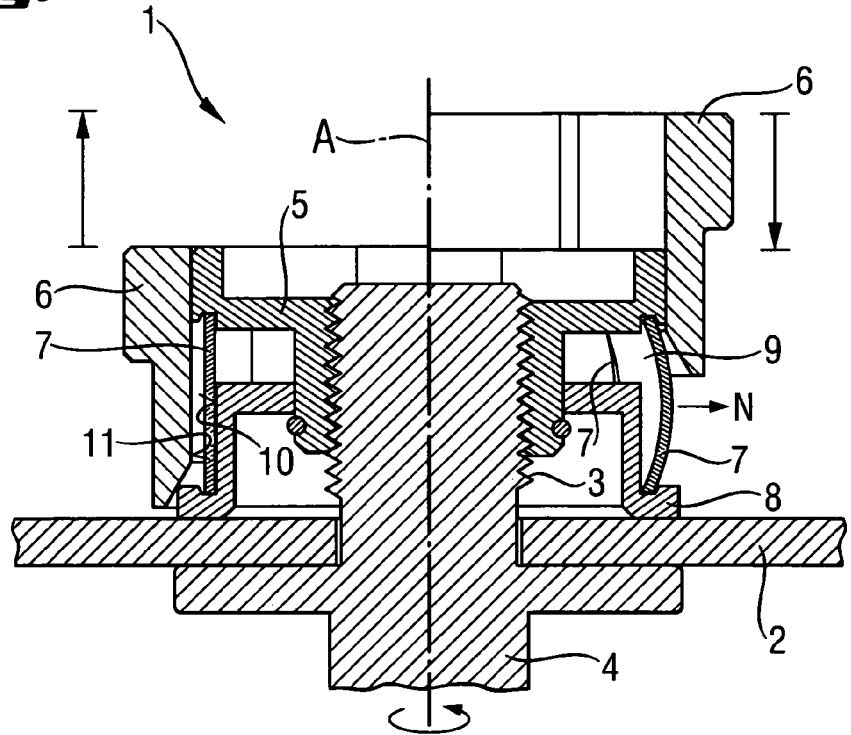
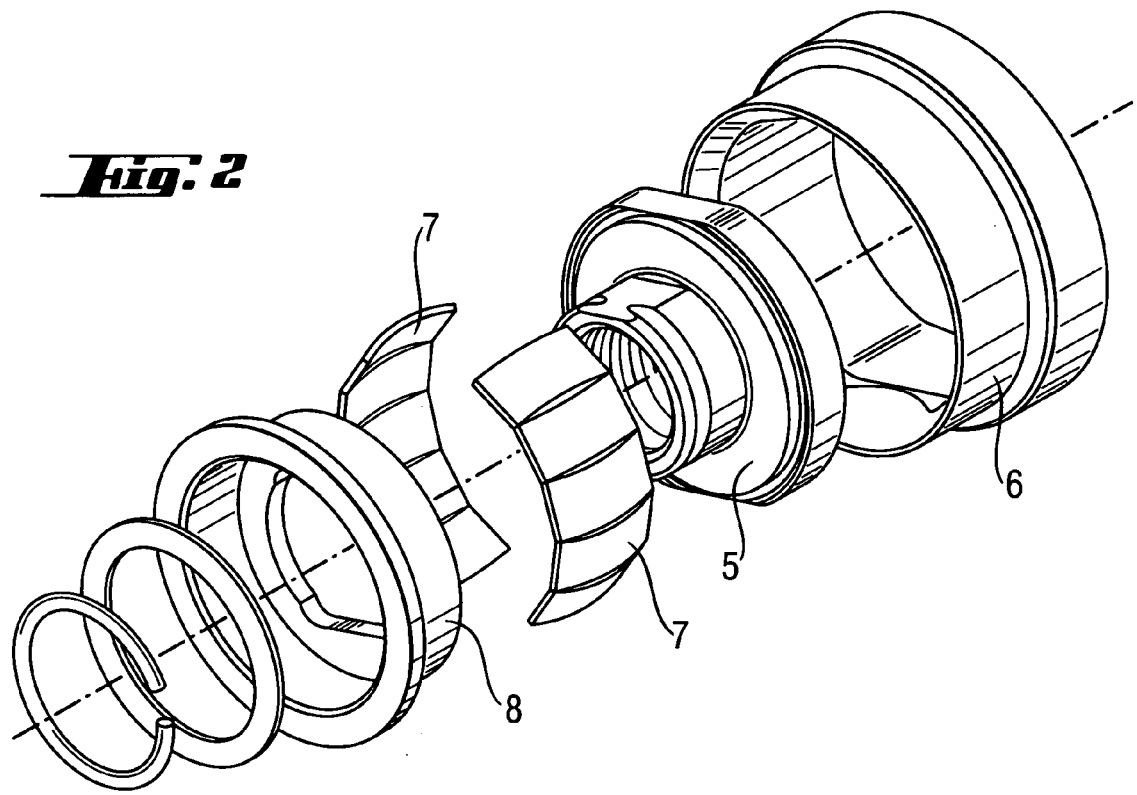

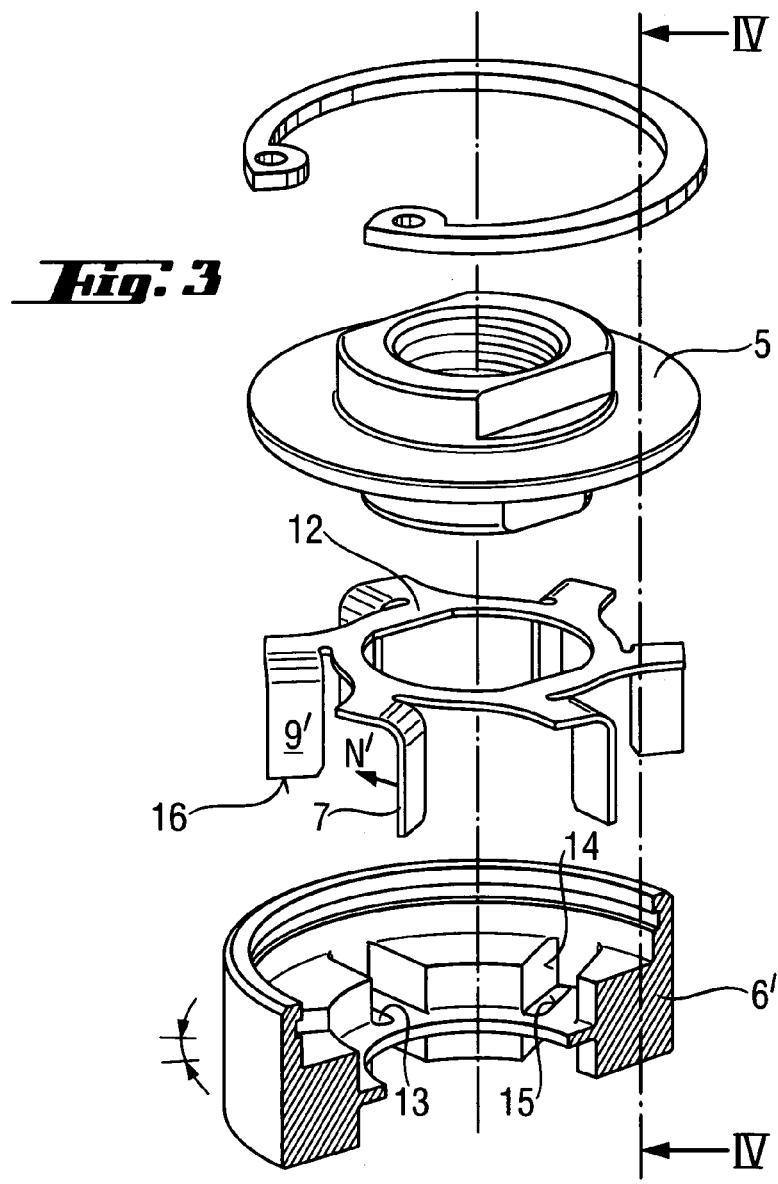
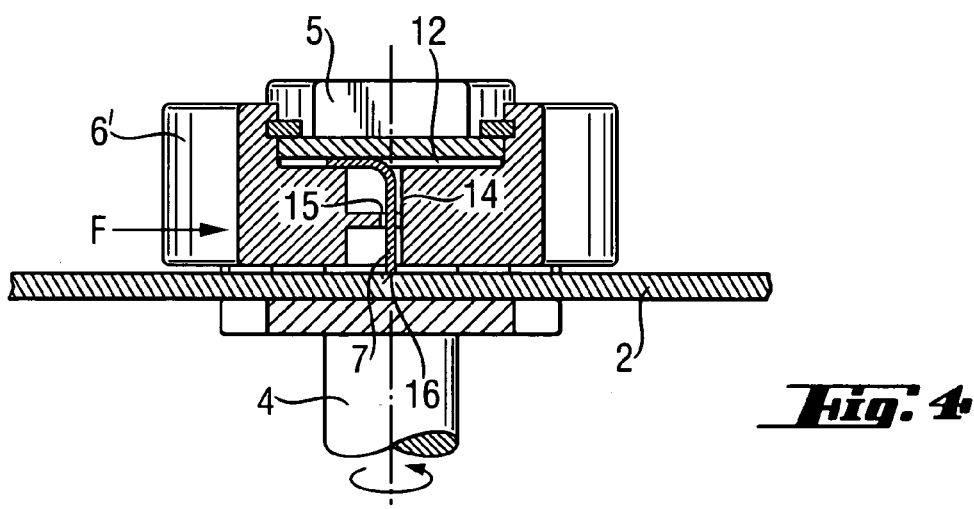

QUICK-LOCK NUT FOR A DISC-LIKE TOOL

BACKGROUND OF THE INVENTION

The invention relates to a quick-lock nut for disc-like tools, such as circular saw blades or cutting wheels.

This type of quick-lock nut generates via the thread of the driving working spindle, the necessary axial force for reliable positive frictional locking of the disc-like tool. The quick-lock nut has clamping means for the purpose of axial clamping and release for quick assembly and disassembly of the quick-lock nut in the absence of a tool.

According to DE 3605821, a quick-lock nut has two leaf springs extending along the axis for generating a radial tension, the springs each biasing a semi-annular threaded segment. According to DE 3210448, a peripheral leaf spring extending along the axis radially biases two semi-annular threaded segments.

According to DE 10002263 a quick-lock nut for a disc-like tool has two leaf springs extending along the axis for generating a radial tension on radially displaceable expanding bodies. The expanding bodies displaceable between the threaded part and an axial stop are sensitive to fouling, which can block the gliding movement of the expanding bodies between the threaded part and the axial stop, such movement being necessary for clamping and release.

SUMMARY OF THE INVENTION

The object of the invention is to provide a simple quick-lock nut that is insensitive to fouling.

Essentially, a quick-lock nut for positive frictional locking securement of a disc-like tool to an external thread on a working spindle driven about a rotational axis has an associated inner threaded part and a manually displaceable tensioning means for axial clamping and release of the inner threaded part relative to the tool, wherein at least one leaf spring extending essentially parallel to the axis of rotation is associated with the inner threaded part, by means of which the inner threaded part can be tensioned axially resiliently with the tool.

Because the axial force is transmitted via the leaf spring or springs extending parallel to the axis of rotation, its stability is required for the positive frictional locking clamping. If a critical load is exceeded (Euler-buckles) the leaf spring moves spontaneously out of this leaf, unstable form into a more stable buckled form or a bent form, which at equal deformation transmits lesser axial forces and is consequently released. Accordingly, a deflecting or buckling out via the tensioning means can be utilized for clamping and release of the quick-lock nut. A sliding movement of the leaf spring towards the threaded part or towards the tool does not occur at the time of clamping and release.

Advantageously, the leaf spring has an axial stop, further advantageously a circular annular axial stop, arranged on the tool side, the stop being axially displaceable relative to the inner threaded part, whereby the leaf spring does not come directly into pressure contact with the tool, whereby plastic deformation on the tool is avoided.

Preferably, a plurality of individual leaf springs are arranged in a peripheral distribution, whereby the axial forces are axially symmetrically distributed and multiplied, without altering their bending and buckling behavior by means of peripheral flexure of the leaf spring.

Advantageously, the leaf spring has a uniformly leaf zone of elasticity, whereby a defined buckling (Euler buckling) in the form of a global failure occurs within the zone of elasticity.

Alternatively advantageously, the leaf spring has a uniformly leaf, axial circular cylindrical sleeve segment strip acting as the zone of elasticity, whereby a defined buckling in the form of a local failure occurs within the zone of elasticity.

Advantageously, the displacement of the leaf spring is perpendicularly radially oriented, whereby the buckling and bending necessarily occurs in the radial sense and can be manually controlled by displaceable radial stops.

Further advantageously, the axial stop or the inner threaded part forms an outwardly oriented, inner radial stop and the manually displaceable tensioning means forms an outer radial stop oriented inwardly for the leaf springs arranged therebetween whereby the bending and buckling can be prevented manually.

Advantageously, the tensioning means is configured as an axially extending manually displaceable sleeve, whereby in the clamping position effective as outer radial stop the bending and buckling is reliably prevented and in the release position ineffective as outer radial stop, the bending and buckling resulting in release is enabled.

Advantageously, the perpendicular direction of the leaf spring is radially oriented, whereby the buckling and bending necessarily occurs in the tangential sense and can be manually controlled by displaceable tangential stops.

Advantageously, the axial stop or the inner threaded part forms a tangentially oriented tangential stop and the manually displaceable tensioning means forms an opposing tangentially oriented counter-tangential stop for the leaf springs arranged therebetween transaction, whereby the bending and buckling can be prevented manually by axial displacement of the tensioning means.

Advantageously, the tensioning means is configured as a rotationally displaceable cage, whereby the tensioning position of the tensioning means reliably prevents the bending and buckling and in the release position forced by application of a tangential force the bending and buckling resulting in release is initiated.

Alternatively advantageously, the tensioning means is configured as a manually axially displaceable cage, which forms an opposing tangentially oriented counter-tangential stop for the leaf springs arranged in an opening between these two, whereby the bending and buckling can be manually prevented by axial displacement of the tensioning means.

BRIEF DESCRIPTION OF THE DRAWING

The invention will be explained in more detail using advantageous exemplary embodiments, wherein:

FIG. 1 represents a quick-lock nut in axial section;

FIG. 2 represents an exploded representation of the quick-lock nut in FIG. 1;

FIG. 3 represents an exploded representation of another embodiment;

FIG. 4 represents another embodiment in axial section;

DETAILED DESCRIPTION OF THE INVENTION

Figure 5:
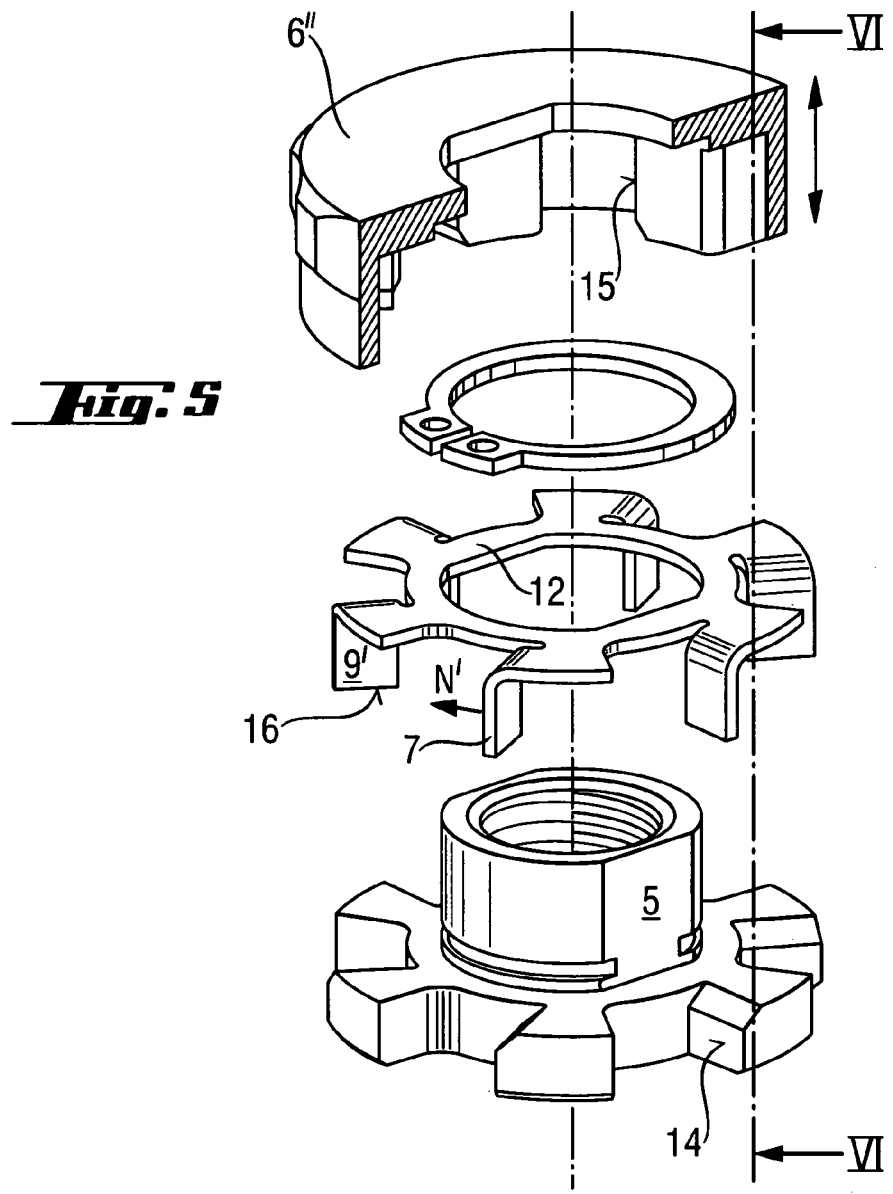
FIG. 5 represents another embodiment in an exploded arrangement.

According to FIG. 1, a quick-lock nut 1 is arranged for positive friction locking securement of a disc-like tool 2 to an outer thread 3 on an axially extending working spindle 4 driven about an axis of rotation A. An axially extending inner threaded part 5 is in threaded engagement with the outer thread 3 and a manually displaceable tensioning means 6 in the form of an axially extending manually displaceable sleeve is located radially outwardly of the part 5. A plurality of leaf springs 7, extending parallel to the axis of rotation A, are mounted in the inner threaded part 5 on the tool side, with an axially displaceable, circular annular axial stop 8, mounting one end of the leaf springs, is arranged on the tool side relative to the inner threaded part 5. By means of the leaf springs, the inner threaded part 5 is axially elastically connected and tensioned via the axial stop 8 with the tool 2. The leaf springs 7 have a uniformly leaf, circular cylindrical sleeve segment strip with a zone of elasticity 9, and having a perpendicular part mounting the spring ends which is radially oriented. In the right half-section the axial release of the inner threaded part 5 relative the tool 2 is represented, wherein the leaf spring can buckle freely radially outward. In the case of the axial tensioning means represented in the left half-section, the axial stop 8 forms an inner radial stop 10 facing outwardly and the tensioning means 6 displaced on the tool side forms an outer radial stop 11 oriented inward for the leaf springs 7 arranged between stops 10 and 11 preventing buckling of the leaf springs 7.

According to FIG. 2, the plurality of leaf springs 7 extend axially between the circular annular axial stop 8 and the inner threaded part 5.

As shown in FIG. 3, a spring collar 12 is arranged between the inner threaded part 5 and the manually displaceable tensioning means 6'. The leaf springs 7 arranged on the common spring collar 12 have a uniformly leaf zone of elasticity 9', whose perpendicular surface N' is peripherally oriented. The tensioning means 6' in the form of a rotationally displaceable cage with openings 13 for the leaf springs 7 forms a tangentially oriented stop 14 and an opposing tangentially oriented counter stop 15 for the leaf springs 7 arranged between the two stops 14, 15.

In FIG. 4, in the tensioning arrangement represented therein, the tangential stop 14 and the opposing tangentially oriented counter tangential stop 15 extends equally freely adjacent to the leaf springs 7 arranged between them, whose axial tension is less than the buckling load, whereby tangential buckling is prevented. By the application of a tangential force F using the rotational displacement of the tensioning means 6' a tangential buckling of the leaf springs 7 can be produced manually, whereby the quick-lock nut 1 is released. The tool-side front edges 16 of the leaf springs 7 are in direct pressing contact with the tool 2, which is seated on the driving working spindle 4.

According to FIG. 5, a spring collar 12 is arranged between the inner threaded part 5 and the manually displaceable tensioning means 6". The leaf springs 7 arranged on the common spring collar 12 have a uniformly leaf zone of elasticity 9', whose perpendicular surfaces N' are peripherally oriented. The inner threaded part 6 forms a tangentially oriented stop 14 and the manually displaceable tensioning means 6" in the form of an axially displaceable cage forms an opposing tangentially oriented counter-tangential stop 15 for the leaf springs 7 arranged between them.

Figure 6:
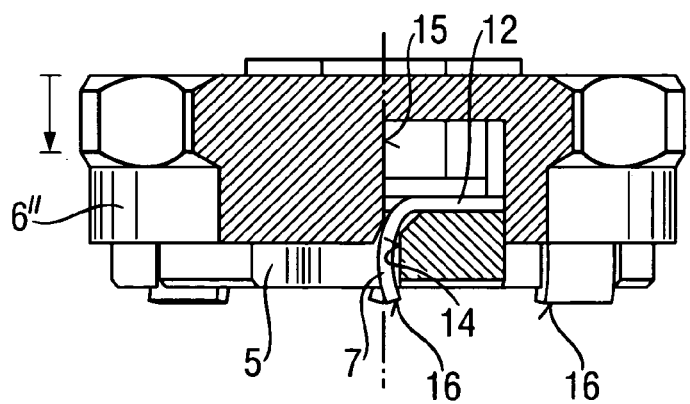
FIG. 6 represents another embodiment in an axial section.

In FIG. 6, in the released condition represented, the tangential stop 14 and the opposing counter-tangential stop 15 allow a tangential buckling of the leaf springs 7 arranged between them.

What is claimed is:

1. A quick nut for positive friction locking of a disc-like tool (2) to an external thread (3) of an axially extending working spindle (4) driven about an axis of rotation (A), said nut having an axially extending inner-threaded part (5) encircling said axis of rotation (A) for engagement with said external thread (3), a manually displaceable tensioning means (6, 6', 6") encircling said axis of rotation (A) and movable axially relative to said inner threaded part (5) between a clamping position and a release position relative to said tool (2), and a spring structure encircling said inner threaded part (5) comprising at least one leaf spring (7) extending generally parallel to the axis of rotation (A) and being bowed in an axial direction in said release position, said at least one leaf spring being deflectable in the clamping position by said tensioning means into flat leaf spring in an axial direction and having first and second axially spaced ends, said first end being mounted in a stop (8) and said second end being mounted in said inner threaded part (5).

2. A quick-lock nut, as set forth in claim 1, wherein said at least one leaf spring comprises multiple leaf spring (7) distributed in a circumferential arrangement encircling said axis of rotation (A).

3. A quick-lock nut as set forth in claim 1, wherein said stop (8) is a separate axially displaceable stop (8) extending axially relative to said inner threaded part (5).

4. A quick-lock nut, as set forth in claim 3, wherein said inner threaded part (5) is in part cylindrical in the axial direction and extends towards said stop (8), said stop (8) having a circular annular form.

5. A quick-lock nut, as set forth in claim 1, wherein said at least one leaf spring (7) has a uniform flat zone of elasticity (9').

6. A quick-lock nut, as set forth in claim 5, wherein said at least one leaf spring (7) has a uniformly flat circular cylinder sleeve segment strip forming the zone of elasticity (9).

7. A quick-lock nut, as set forth in claim 6, wherein said at least one leaf spring (7) is displaceable in a radial generally perpendicular direction relative to the axial direction of said spindle (4).

8. A quick-lock nut, as set forth in claim 7, wherein one of said axial stop (8) and said inner threaded part (5) has a radially outwardly extending radial stop (10), and said manually displaceable tensioning means (6) forms a radially inwardly oriented stop (11) for said at least one leaf spring arranged therebetween.

9. A quick-lock nut, as set forth in claim 8, wherein said tensioning means (6) is formed as a sleeve manually displaceable in the direction of the axis of rotation (A).

10. A quick-lock nut, as set forth in claim 5, wherein the zone of elasticity (9') extends circumferentially of said axis of rotation.

11. A quick-lock nut, as set forth in claim 10, wherein one of said stop (8) and said inner threaded part (5) comprises a tangential stop (14) and said manually displaceable tensioning means (6) has an opposing tangentially oriented counter tangential stop (15), with said at least one leaf spring (7) arranged therebetween.

12. A quick-lock nut, as set forth in claim 10, wherein said manually displaceable tensioning means (6") forms a tangentially oriented tangential stop (14) with an opposing tangentially oriented counter tangential stop (15), with said at least one leaf spring (7) arranged in openings (13) therebetween.

13. A quick-lock nut, as set forth in claim 12, wherein said manually displaceable tensioning means (6, 6") is formed as a manually axially displaceable cage.

* * * * *